B. J. CRANE.

Improvement in Wheel-Plows.

No. 128,952. Patented July 16, 1872.

Witnesses:

Inventor:

UNITED STATES PATENT OFFICE.

BENJAMIN J. CRANE, OF RIPON, WISCONSIN.

IMPROVEMENT IN WHEEL-PLOWS.

Specification forming part of Letters Patent No. 128,952, dated July 16, 1872.

I, BENJAMIN J. CRANE, of Ripon, in the county of Fond du Lac and State of Wisconsin, have invented certain Improvements in Sulky-Plows, of which the following is a specification:

My invention relates to that class of plows commonly known as sulky-plows; and the nature thereof consists in certain modifications and improvements in the details of the construction of the same, hereinafter described and shown.

Figure 1:
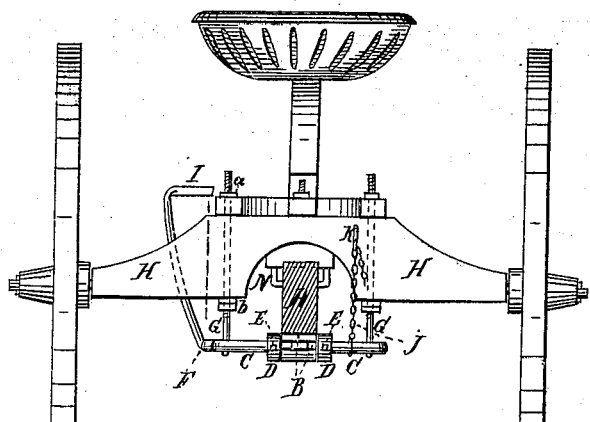
Figure 3:
Figure 2:
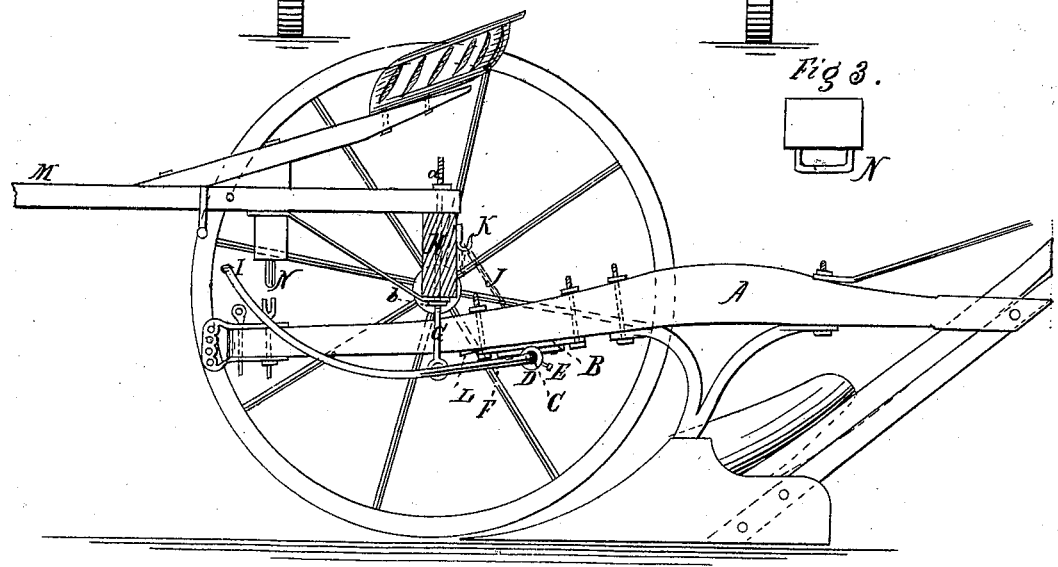

Figure 1 is a rear elevation of a machine embodying my invention. Fig. 2 shows the double plates of iron which confine the crank-shaft; also the adjustable wedge-shaped plate. Fig. 3 is the stop-bar, belonging on the under side of the pole of the sulky.

A common plow is used without alteration any further than to attach on the under side of the plow-beam A, near the center of the length of the beam, double iron plates B, the lower one grooved so as to receive the double crank-shaft C supporting the plow, and this shaft has an adjustable collar or annular flange, D, on each side of the double plate B to hold the plow in place, and the plow is made adjustable to regulate the width of the furrow simply by loosening the set-screw E passing through the collar D binding on the shaft C. The double cranks F F extending forward from the shaft C are pivoted in the supporting-bars G G, these being placed vertically downward through and below the sulky-axle H. One of the cranks F is extended forward and upward from where it is pivoted at the bar G, making a foot-lever, I, by which the plow is easily raised from or lowered to the ground, and when the lever I is down and the plow raised it is held in place by tightening up the chain J and securing it in the compressed hook K fastened to the sulky-axle H. The chain J has a ring at one end that loosely fits over the shaft C, and its upper part rests in the hook K, any link serving as a key or toggle to hold the chain in place, and in this manner the depth of the furrow is regulated by shortening or lengthening the chain. The plow is leveled crosswise by a wedge-shape plate, shown at L in Fig. 2, this wedge being placed between the double plates B and the under side of the plow-beam A; also, one of the supporting-bars G is made adjustable upward or downward by the nuts or burrs $a$ and $b$ above and below the axle H of the sulky. M is the pole or tongue of the sulky, and on the under side of this pole, just short of the end of the plow-beam A, there is fastened a downward-projecting stop-bar, N, which serves to help throw the plow clear from the ground when the foot-lever I is borne down, the plow then being held in an elevated position by the chain J when dropped into the hook K. When the plow is raised and locked by the chain it and the pole are very nearly balanced on the sulky-axle H.

This invention supplies a cheap and efficient sulky-plow that is readily adjustable, easily controlled, and of very light draft, and admits of the use of such plows and of cultivator or seeding-machine wheels as farmers generally have now on hand, thereby saving the cost of purchasing entirely new implements at expensive rates.

Having thus described the construction and operation of my invention, I claim and desire to secure by Letters Patent—

The beam A provided with the double plates B, the axle H, the adjustable supporting-bars G, the crank-shaft C pivoted to the support G, the foot-lever I, all combined and operating together as and for the purposes described.

BENJAMIN J. CRANE.

Witnesses:
WILLIAM K. WYCKOFF,
NICOLL H. WYCKOFF.